(No Model.)
O. LUGO.
ELECTRIC BATTERY.
No. 346,053. Patented July 20, 1886.
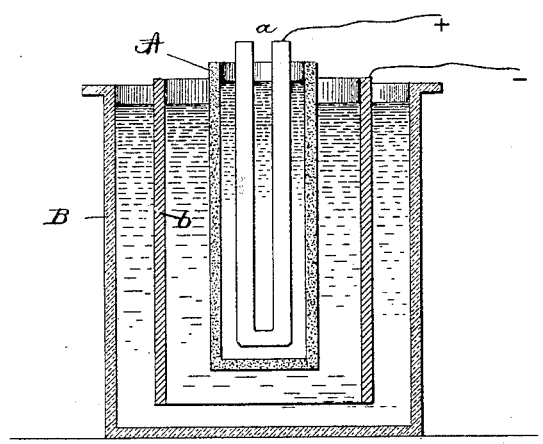
Witnesses:
W. W. Mortimer
H. F. Riley
Inventor:
Orazio Lugo
by R. G. Dyrenforth
his Attorney

UNITED STATES PATENT OFFICE.

ORAZIO LUGO, OF NEW YORK, N. Y.

ELECTRIC BATTERY.

SPECIFICATION forming part of Letters Patent No. 346,053, dated July 20, 1886.

Application filed April 30, 1886. Serial No. 200,724. (No model.)

*To all whom it may concern:*

Be it known that I, ORAZIO LUGO, a citizen of the United States, residing at New York, in the county of New York and State of New York, have invented certain new and useful Improvements in Electric Batteries; and I do hereby declare the following to be a full, clear, and exact description of the invention, such as will enable others skilled in the art to which it appertains to make and use the same.

My invention relates to galvanic batteries.

The object is to obtain a constant electrical energy—that is to say, constant volt-ampère.

My invention consists in a method of keeping the negative element free from deposit of other elemental matter; also in keeping the solution with which the negative element is in contact nearly of the same composition as when at first used.

The drawing represents a central vertical section of a cell embodying my invention.

To carry my invention into effect I construct a cell of two elements, one being zinc, while the other may be carbon, and these elements are immersed in two liquids, the one being alkaline, the other neutral.

The carbon element $a$ is in a porous cup, A, containing a metallic chloride solution—such as a solution of chloride of copper; or it may contain a mixture of oxide and chloride of copper in solution. The zinc element $b$ is in the outer jar, B, generally of glass, containing a solution of a caustic alkali—such as soda. The two elements constituting the battery are thus in contact with two different liquids or solutions.

The current of the battery will remain constant until the alkaline solution in contact with the positive element (zinc) is saturated or until the zinc is consumed, if the caustic solution is in excess. The electro-motive force of the cell would also remain constant if the contact-liquid of the negative element (the carbon) should not be changed and another contact element—such as copper—should be presented. The electro motive force of the battery would then remain at about two and two-tenths volts, carbon being the negative element. The amount of current (ampère) desired to be obtained is in direct proportion to the surface of each element exposed, whether the negative element be carbon or copper. A battery thus composed proved to be constant in current with a constant external resistance; but it cannot remain constant in electro-motive force for the reason that the carbon element becomes covered with metallic copper, thus proportionally diminishing the electromotive force of the battery, especially after the chloride of copper is used up by the work which the battery has performed. In operation the chloride is first formed into a hydrated oxide, and then reduced to metallic copper by the hydrogen liberated at the carbon electrode, when all electrical action would cease irrespective of the condition of the zinc or other positive element and of the caustic solution. The problem, therefore, is to obtain the constant electrical energy—that is to say, constant volt-ampère.

I have succeeded in solving the problem or obtaining the desired result by providing means to keep the negative element or carbon electrode free from other elements, and at the same time keeping the solution with which the carbon is in contact nearly of the same composition as when at first employed.

As above stated, the action of the battery when in action is to deposit metallic copper upon the carbon. The chloride of copper is first decomposed, the chlorine going to the zinc, and there being formed first zinc chloride, and ultimately zincate of soda, or a mixture of soda and oxide of zinc, leaving a hydrated oxide of copper and metallic copper in the porous cup with the carbon; but I obviate the deposit of copper as follows: I make the carbon electrode in the form of a cup, or of any other desired form, and place in it or in contact with it free hydrochloric acid, when no metallic copper can accumulate or be deposited on the carbon electrode, since it will be immediately dissolved. In this manner I keep a full carbon contact and obtain a constant electro-motive force due to the uniform contact of the carbon element. Again, as the action of the battery is to deposit copper on the carbon and the carbon is saturated with hydrochloric acid, this attacks or dissolves the copper as it is deposited, and a new supply of chloride of copper is constantly formed, (so long as free hydrochloric acid is present,) thus constantly supplying chlorine to the zinc and keeping up the action of the battery.

Having thus fully described my invention, what I claim, and desire to secure by Letters Patent, is—

1. A galvanic cell in which the negative portion is provided with a separate substance, by which the elemental matter deposited in the action of the battery is removed, substantially as specified.

2. A galvanic cell in which the negative portion is provided with a separate substance, by which the elemental matter deposited in the action of the battery is removed, such substance forming, with the removed elemental matter, a compound serving to replenish a portion of the battery.

In testimony whereof I affix my signature in presence of two witnesses.

ORAZIO LUGO.

Witnesses:
C. M. THOMPSON,
GROSVENOR S. HUBBARD.